United States Patent [19]

Gregerson

[11] Patent Number: 4,693,699
[45] Date of Patent: Sep. 15, 1987

[54] SEAL ASSEMBLY FOR ROTARY AND RECIPROCATING MOTION

[75] Inventor: Stanley M. Gregerson, Cedar Falls, Iowa

[73] Assignee: Deere & Company, Moline, Ill.

[21] Appl. No.: 779,554

[22] Filed: Sep. 24, 1985

[51] Int. Cl.$^4$ .................... F16D 3/84; B60K 17/30
[52] U.S. Cl. .................... 464/133; 180/257; 277/58; 464/117
[58] Field of Search .......... 74/391; 180/254, 255, 180/256, 257; 277/5, 31, 58, 60, 93 R; 464/7, 11, 16, 114, 117, 133, 158, 162, 177

[56] References Cited

U.S. PATENT DOCUMENTS

| | | | |
|---|---|---|---|
| 1,361,573 | 12/1920 | Flamand | 464/133 X |
| 1,382,528 | 6/1921 | Miller | 464/11 |
| 1,960,457 | 5/1934 | Roche | 180/257 |
| 2,303,180 | 11/1942 | Swenson | 464/117 X |
| 2,871,966 | 2/1959 | Dreitzler | 180/257 |
| 3,295,624 | 1/1967 | Lee et al. | 180/257 X |
| 3,605,930 | 9/1971 | Ainsworth | 180/257 |

FOREIGN PATENT DOCUMENTS 2061844 5/1981 United Kingdom ............ 464/117

OTHER PUBLICATIONS

Advertising brochure, Carraro, "Assali Differenziali Sterzanti".

Primary Examiner—Daniel P. Stodola

[57] ABSTRACT

A seal arrangement for providing a reliable seal between a shaft and an opening through which the shaft passes where the shaft undergoes both rotary and axial movement relative to the opening. The seal assembly consists of a seal suitable for relative rotary motion between the gasket surface and the surface to be sealed, a sleeve, and a seal suitable for sealing when there is relative axial movement between the seal and the sealed surface. The sleeve is used to isolate the rotary and axial motion of the shaft into two components so that each seal will only see one type of motion. In order to accomplish this, the sleeve is restrained from axial motion relative to the opening and has synchronous rotary motion with the shaft. This seal arrangement is particularly useful in pivotable drive assemblies where the use of a simple universal joint will impose a reciprocating motion on a drive axle.

8 Claims, 3 Drawing Figures

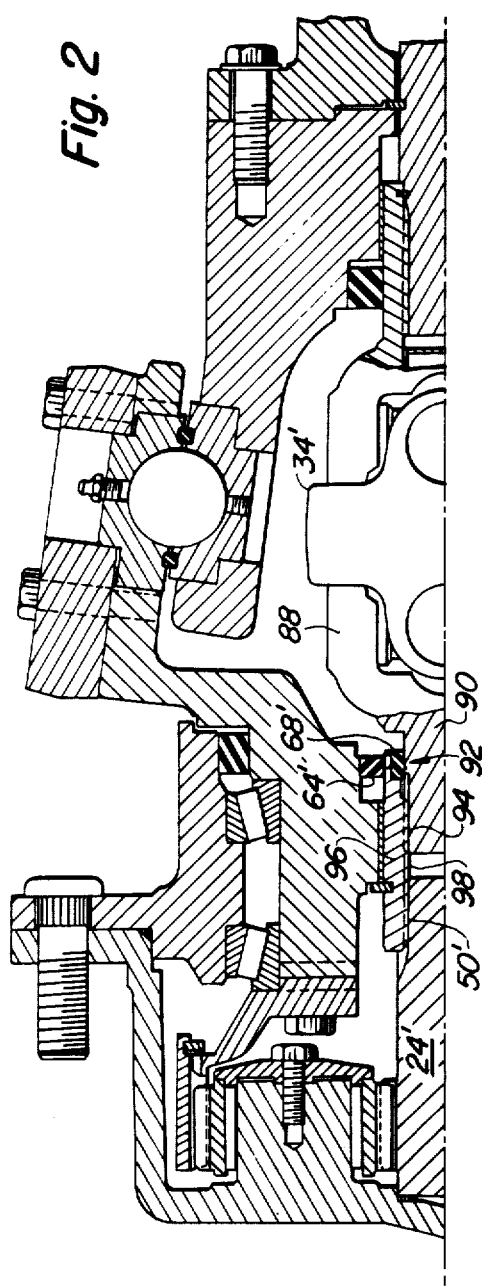
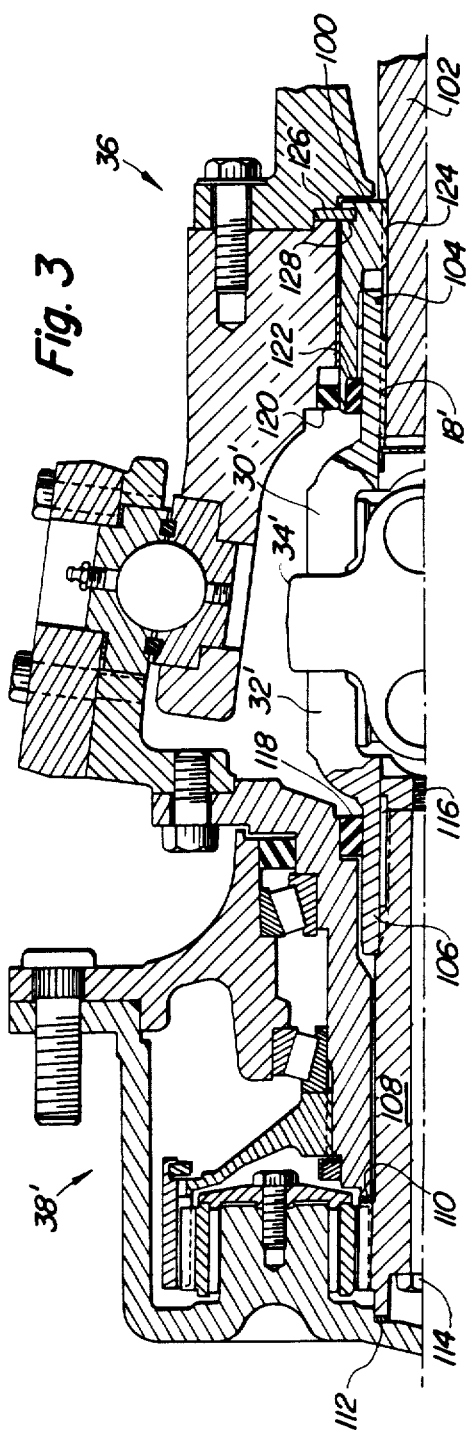

SEAL ASSEMBLY FOR ROTARY AND RECIPROCATING MOTION

BACKGROUND OF THE INVENTION

1. Field of the Invention

This invention relates generally to shaft seals. More specifically, this invention relates to a seal for a housing having an opening through which a shaft passes and the shaft undergoes rotary and axial motion.

2. Description of the Prior Art

Gears trains, pumps and other mechanical drive assemblies are usually located in a housing having a lubricating environment which is ideally is free of atmospheric contaminants such as dirt, moisture, and corrosive chemicals. Shafts for delivering power to such assemblies typically pass through an opening in the housing. In order to keep contaminants out and lubricants in, seals are provided at the opening between the housing and the shaft. Any leakage around this seal can result in a loss of lubricating fluid or entry of contaminants into the housing environment with either condition leading to reduced output or mechanical failure of the drive assembly.

A shaft transmitting power into a housing may undergo rotary motion, axial motion, or both. Acceptable seals for preventing leakage around the shaft and housing for either axial or rotary motion are well-known. However, such seals are specifically suited for only one type of shaft motion. For instance, when there is rotary motion of a shaft relative to the housing, the housing may be sealed with a seal having a relatively thin and flexible lip portion; this allows the seal to compensate for shaft run-out, i.e. eccentric rotation of the shaft, without generating excessive heat. Allowing this flexibility for shaft run-out gives the gasket poor lateral stiffness thereby making the gasket susceptible to buckling in the event of axial rod movement. Furthermore, the reduced cross section makes it easier for fluid or particulates on the shaft to slide past the seal when the shaft moves axially with respect to the seal surface. Conversely, a seal designed for axial movement of a shaft with respect to a housing or seal has a relatively large cross section and a stiff lip portion that is designed to scrape particulates or lubricants from the shaft as it moves across the face of the seal. The greater stiffness of the axial seal compared to the rotary seal is necessary to withstand the buckling forces that axial movement of the shaft generates. The increased radial stiffness of the axial seal is also necessary to maintain contact around the entire circumference of the shaft so that the desired scraping effect is achieved. However, this increased stiffness restricts movement of the seal under shaft run-out so that increased friction between the axial seal and the shaft generates high heat and can cause premature failure of the gasket under rotational conditions. Therefore, no single seal element is presently available that can provide adequate and sustained sealing around a housing opening for a shaft that is undergoing axial and rotary motion.

A good example of an instance where a shaft passing into a housing undergoes axial and rotary motion is in the case of a pivotable drive axle assembly. A typical example of such an arrangement is the steerable drive axle of a vehicle as shown in U.S. Pat. No. 3,605,930 issued to Ainsworth. In the Ainsworth patent, a drive shaft transfers power to a driven shaft in a knuckle housing which is pivotally attached to a yoke housing the drive shaft. The Ainsworth patent uses a Cardan-type joint to transfer power from the drive shaft to a sun shaft housed in the knuckle. As the knuckle assembly is pivoted relative to the yoke, angularity is introduced into the universal joint. In an angled condition, rotation of the shafts causes variation in axial length across the universal joint. Thus as the drive shaft transfers rotary power to the sun shaft across the angled universal joint, of either or both shafts reciprocating motion results. These shafts pass through the knuckle and yoke into lubricating environments separated from the atmosphere by seals at the knuckle and yoke openings. Accordingly, it is necessary to have a seal at at least one opening that can withstand relative axial and rotary movement of a shaft passing therethrough.

One approach to the problem in the case of steerable drive axles has been to use an axially restrained type universal joint which eliminates the reciprocating motion of the shafts when the universal joint is turned at an angle. An example of this type of universal joint is shown in U.S. Pat. No. 2,046,584 issued to Rzeppa. A steerable drive axle using an axially restrained universal joint is shown in U.S. Pat. No. 4,482,025. However, these universal joints are more expensive than Cardan-type joints and require a large boot to seal internal elements of the joint. Aside from the added cost, the possibility of boot rupture when a vehicle operates in rough terrain adds an additional failure mode to the steerable drive axle. Therefore, it is desirable to have a seal that will allow the use of a Cardan-type joint in a steerable drive assembly.

Accordingly, it is an object of this invention to provide a seal for an opening through which a shaft passes which can withstand rotary and axial movement of the shaft.

It is a further object of this invention to improve the reliability of seals around a shaft opening when the shaft has axial and rotary motion.

It is a further object of this invention to provide a seal for a drive shaft in a pivotable drive axle assembly using a Cardan-type universal joint.

SUMMARY OF THE INVENTION

Accordingly, it has been found that a more reliable shaft seal is possible by separating the rotary and axial components of motion and providing two separate seals so that each experiences only one type of motion. Therefore, in one embodiment, this invention comprises a seal arrangement for separating the environment between ends of a shaft. The environments are separated by a partition having an aperture through which the shaft is in communication with both environments. A portion of the shaft is surrounded by a sleeve for uncoupling the dual motion of the shaft. Means are provided to synchronize movement of the sleeve with one type of shaft motion while allowing the other type of shaft motion between the shaft and sleeve. Means are also provided to prevent the unsynchronized type of shaft motion from occurring between the shaft and partition. Communication of the environments along a path between the shaft and the sleeve is blocked by a seal specifically designed to withstand axial motion between the shaft and the sleeve. Communication of the environments along a path between the partition and the sleeve is blocked by a seal specifically designed to withstand rotary motion between the partition and the sleeve. In this manner, the sleeve acts as a common sealing element to isolate different types of motion and allow the use of single motion seals between the shaft and the partition.

In a more limited embodiment, this invention is directed to an oil seal arrangement for a pivotable drive assembly using a universal joint that causes a rotating shaft to undergo axial motion. The seal arrangement of this invention allows the opening in a housing through which the shaft passes to be sealed for rotary and axial motion.

Additional details and embodiments of this invention are disclosed in the following description.

BRIEF DESCRIPTION OF THE DRAWINGS

FIGS. 2 and 3 are views similar to FIG. 1, but showing alternate arrangements.

DESCRIPTION OF THE PREFERRED EMBODIMENT

Figure 1:
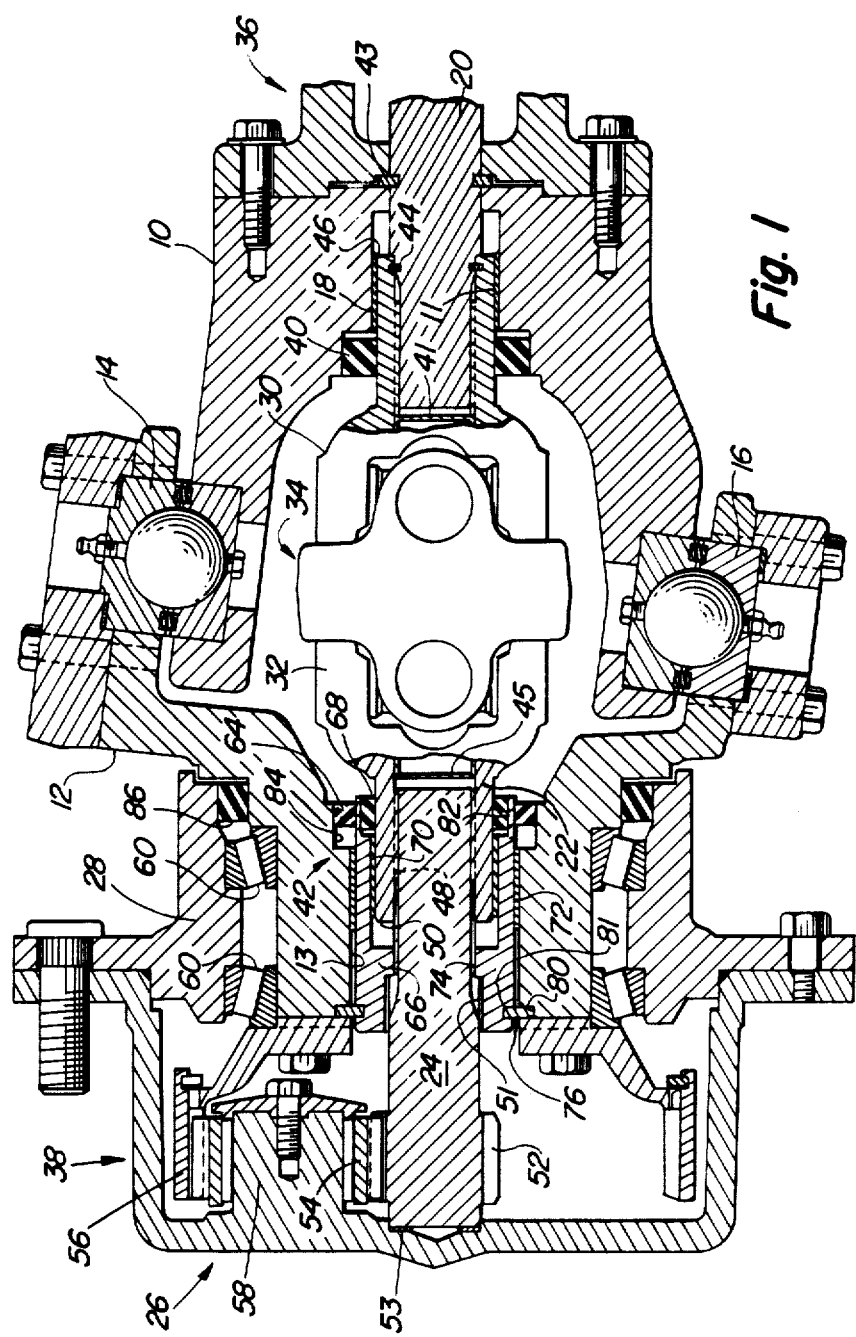
FIG. 1 is a vertical section of a pivotal drive assembly using a seal according to this invention.

This invention is more fully described in the context of a pivotal drive assembly for a steerable drive axle. The pivotal drive assembly of FIG. 1 shows a yoke 10 pivotally connected to a knuckle 12 by upper and lower king pin assemblies 14 and 16. A hollow stub shaft 18 is located within yoke 10 and passes through an opening 11. Shaft 18 is connected to a power source (not shown) by shaft 20. Another hollow stub shaft 22 is located in knuckle 12 and passes through an opening 13. Shaft 22 drives a sun shaft 24. Sun shaft 24 transfers power to planetary gear system 26 and ultimately to rotatable wheel hub 28. Shafts 18 and 22 are part of a double Cardan-type universal joint 34 having, with respect to the orientation of FIG. 1, left and right yoke ends 32 and 30. Stub shafts 18 and 22 extend outward, respectively from the right and left yokes 32 and 30 of the universal joint 34.

Looking more closely at the shaft arrangement, drive shaft 20 is splined or keyed into and guided by shaft 18. A bearing 46 centers shaft 18 in the yoke opening. In the knuckle portion of the steerable drive axle, shafts 22 and 24 are engaged by a series of splines 48 and 50 on the inside of the shaft 22 and the outside of the shaft 24, respectively. The splined connection between shafts 22 and 24 allows relative axial movement between the two shafts. Depending on the power requirements, the splines 48 and 50 could be replaced with a simple key arrangement. At the end of shaft 24, opposite shaft 18, is a sun gear 52. Sun gear 52 engages planet gears 54 which revolve in response to rotation of shaft 24 and reaction with a ring gear 56 which is fixed with respect to knuckle 12. The revolving motion of planet gears 54 is transferred to hub 28 by carrier shaft 58 and causes the hub to rotate on a set of tapered bearings 60. The tapered bearings 60 allow rotation but prevent axial movement of the hub 28 relative to the knuckle 12. An oil seal 86, designed to withstand rotary motion is placed between the hub 38 and the knuckle 12. Shaft 24 is centered by interaction with planet gears 54 at its left end and engagement within shaft 22 at its right end. Guiding of shaft 22 relative to the knuckle is provided by a pair of annular bearings 70 and 72 which are in contact with the shaft and the perimeter of the knuckle opening, respectively. Opposing inside and outside surfaces of bearings 72 and 70 contact an annular sleeve 66 which is free to rotate about the bearings and forms part of the hereinafter described seal arrangement. Axial movement of shaft 24 relative to the knuckle is restrained by a thrust washer 53 located adjacent the left end of the shaft and a ridge 51 towards the center of shaft rightwardly abutting a set of splines 74 on sleeve 66.

Yoke 10 serves as the end of a drive shaft housing 36 for shaft 20 while knuckle 12 and hub 28 serve as a planetary housing 38 for shafts 22 and 24. The interior of both of these housings contain lubricants for the axles, bearings, and related gear assemblies. Housings 36 and 38 also act as partitions separating the lubricating environment within the housing from the dust-filled environment that often exists outside the housings.

Intermixing of these environments or the loss of lubricant and entry of dirt into the drive shaft housing through the yoke opening 11 is prevented by an oil seal 40 around the outside of shaft 18 and an end closure 41 at the left end of the shaft's hollow interior. Shaft 20 is restrained from axial movement with respect to the shaft housing by thrust washer 43 which fits into opposing slots in the shaft housing 36 and shaft 20. Relative axial movement between shafts 18 and 20 is prevented by a retaining ring 44 bridging across shaft 18 and axle 20. As a result of the restrained axial movement of shaft 18, seal 40 only experiences rotational movement and is easily provided by those skilled in the art.

Opening 13 for shaft 22 in planetary housing 38 is also sealed. However, unlike shaft 18, shaft 22, due to the presence of universal joint 34 and the axial restraint of shaft 18, experiences axial and rotational motion. Allowing free axial movement of the shaft 22 relative to shaft 24 along splines 48 and 50 requires the addition of lubrication and elimination of contaminants from this area. Therefore, the hollow interior of shaft 22 serves as an axial passage for transferring lubricants to the splines and is sealed at its right end by an end closure 45. Furthermore, in order to accommodate the dual motion of shaft 22, a seal arrangement, according to this invention, is shown around shaft 22 and generally indicated by 42.

Seal arrangement 42 consists of a rotary seal 64, sleeve 66, and an axial seal 68. Splines 74 on the inside surface of sleeve 66 engage splines 50 of shaft 24 and synchronize rotary movement between sleeve 66 and shaft 22. Axial movement of the sleeve 66 relative to the knuckle is prevented by a thrust washer 76. Thrust washer 76 acts as a key bridging the opening between knuckle 12 and sleeve 66 and is retained in a groove 80 within housing 12. An annular groove 81 on sleeve 66 engages thrust washer 76 and allows the sleeve to rotate freely about the washer. At its far right end, sleeve 66 has an annular recess 82 around its inside surface. Retained within annular recess 82 is axial seal 68. Axial seal 68 is designed for relative axial movement between the sleeve 66 and the shaft 22. Since the seal is retained within recess 82, shaft 22 moves axially with respect to the sleeve 66 and seal 68. Radially outward from the axial seal, knuckle 12 has a recess 84 retaining rotary seal 64. Rotary seal 64 is specifically designed for relative rotational movement of the outside surface of sleeve 66 with respect to the inside surface of seal 64.

FIG. 1 shows seals 64 and 68 in block form. The major requirements of these seals is that the rotary seal be able to withstand relative rotary motion, the axial seal be able to withstand relative axial motion, and that both seals be suitable for the internal and external environments of the housings. There are a variety of seals known to those skilled in the art which can satisfy these requirements. In addition, there are many seal configurations which can be used between the knuckle opening and sleeve, and the sleeve and shaft, respectively. For example, the axial seal 68 could be replaced by flexible diaphragm or metallic bellows. However, in this preferred embodiment, it is generally contemplated that both seals will be made of a hard rubber material. The hardness of the rubber in the rotary seal will usually be about 80 durometer. The axial seal could also be made of a rubber material with a similar hardness to that of the rotary seal. However, in extremely abrasive environments it may be desirable to increase the stiffness of the axial seal material to about 90 durometer. This would make the axial seal material stiff and abrasion resistant relative to the rotary seal. Although both seals may be made of a material having the same stiffness, the overall stiffness of the seals is varied by altering the thickness of the seal. Typically, the rotary seal will have a thin cross section with a high degree of interference between the seal lip and the sleeve but will exert only a low amount of lip force on the sleeve thereby making the rotary seal relatively compliant. In contrast, the axial seal will be much thicker and, while possibly having less interference or lip pressure than the rotary seal, will exert a larger total lip force on the shaft to provide the necessary scraping action along the outside of shaft 22.

In operation, this invention uses these two distinct seals independently to perform different sealing functions. Looking then at the operation of the pivotal drive assembly and the function of these seals, a mechanical power source (not shown) drives axle 20 and transfers power across the shafts, universal joint, planetary gear system, hub and ultimately to a drive wheel (not shown). When shafts 20 and 22 are axially aligned, i.e., no pivotal movement of the drive assembly has taken place, shaft 20 transfers essentially pure rotational movement to shaft 22 through universal joint 34. Under this condition, the relative position of shaft 22 with respect to shaft 24 and sleeve 66 remains unchanged. Thus the only relative movement in the seal arrangement is between rotary seal 64 which is fixed with respect to housing 12 and the outer surface of sleeve 66 which rotates with shaft 24. As knuckle 12 is pivoted with respect to yoke 10 the angularity of universal joint 34 causes shaft 22 to increase its projection into knuckle 12. Retaining ring 44 and thrust washer 43 prevent axial movement of shaft 18, thus, the change in axial length caused by angular movement across universal joint 34 is transferred entirely to shaft 22. As shaft 22 moves in and out of knuckle opening 13, sleeve 66 and shaft 24 remain axially fixed with respect to the knuckle. Therefore, only shaft 22 sees the axial motion imparted by the universal joint. Axial seal 68 by virtue of its retention in sleeve 66 is already rotating in synchronized movement with shaft 22; therefore, seal 68 only undergoes relative sliding movement between its inner surface and the outer surface of shaft 22. Accordingly, sleeve 66 acts to uncouple rotary and axial motion of the shaft 22 so that each seal in the seal arrangement only sees the type of motion for which it is specifically suited.

FIG. 2 shows a similar, but modified, pivotal drive axle assembly using the seal arrangement of this invention. The rotary and axial seals 64' and 68' depicted in this figure, function in a manner similar to that described in conjunction with FIG. 1. However, the left end of double Cardan joint 34' has a yoke 88 connected to a solid stub shaft 90. Stub shaft 90 has a series of splines 94 which mesh with another mating series of splines 98 on the inside of a sleeve 96. To the right of splines 94, a portion of stub shaft 92 has a circular cross section which is in contact with the inner surface of axial gasket 68'. In this embodiment, the entire mechanical load from shaft 90 is transferred to sleeve 96 and is in turn transferred from sleeve 96 to shaft 24' across splines 98 and 50'. Thus, shaft 90 turns sleeve 96 in unitary rotary motion while sleeve 96 acts as a coupling to transfer power from shaft 90 to shaft 24'. Apart from the changes to the sleeve and shafts, the drive assembly depicted in FIG. 2 operates in essentially the same manner as that shown in FIG. 1.

Another drive axle arrangement incorporating the seal assembly of this invention is shown in FIG. 3. The assembly of FIG. 3 differs from that of FIGS. 1 and 2 in that the seal assembly is located in the yoke portion of the pivotal drive assembly. In this embodiment, yoke end 30' of the universal joint 34' is again connected to hollow shaft 18' which is splined to a drive shaft 102. At the left end of universal joint 34', yoke 32' is again attached to a hollow shaft 106 which is splined to a sun shaft 108. Relative axial movement of shaft 108 with respect to the knuckle and hub housing is prevented by thrust washers 110 and 112 in contact with the knuckle and hub, respectively. A bolt 114 extends coaxially through shaft 108 and is threaded into opening 116 of the universal joint yoke 32'. Upon tightening, bolt 114 prevents any axial movement between shafts 106 and 108. With the knuckle end of the universal joint restrained from axial movement, all of the reciprocating action previously described now takes place on the yoke end of the drive assembly. Accordingly, shaft 18' now moves axially with respect to shaft 102. Thus, shaft 106 has an oil seal 118 designed for rotary motion which seals the interior of planetary housing 38' while the seal assembly of this invention is now located around shaft 18'.

The seal assembly around shaft 18' consists of a rotary seal 120, a sleeve 100 and an axial seal 122 with the seals and sleeve operating essentially in the same manner as previously described. Synchronous movement of the sleeve with shaft 18' is provided by a series of splines 124 located on the inner surface of sleeve 100 which mesh with a series of splines 104 on the outer surface of shaft 102. Sleeve 100 is retained from axial movement by a thrust washer 126 fixed to the yoke housing and extending into an annular groove 128 having sufficient clearance to allow rotation of the sleeve relative to the washer.

Although the seal arrangement of this invention has been described in conjunction with specific configurations of a pivotable drive assembly, those skilled in the art are aware of many additional applications and variations which may be used to practice this invention. Accordingly, this invention is not to be limited by the specific details of the foregoing description.

I claim:

1. A seal arrangement for a housing of a planetary drive assembly having an input shaft that undergoes rotary and axial motion, said seal arrangement comprising:

a housing supporting said planetary drive assembly;

an aperture in said housing;

a gear shaft having synchronous rotary movement with said input shaft and driving a sun gear of said planetary drive assembly;

a sleeve radially surrounding at least a portion of said input shaft and dividing said aperture into a first aperture portion between said sleeve and said housing and a second aperture portion between said sleeve and said input shaft;

means for moving said sleeve in synchronization with one of said rotary and axial motions of said input shaft;

means for preventing the other type of input shaft motion between said sleeve and said housing;

a first seal in contact with said sleeve and said housing for sealing said first aperture portion between said housing and said sleeve; and a second seal in contact with said sleeve and said input shaft for sealing said first aperture portion between said input shaft and said sleeve.

2. The seal arrangement of claim 1 wherein said sleeve is synchronized with said rotary motion of said input shaft, an outer portion of said sleeve has a circular cross section which is concentric with the axis of rotation of said input shaft and encircled by said housing, and said first seal is disposed around said circular portion of said sleeve and between said circular portion and said housing.

3. The seal arrangement of claim 1 wherein said means for moving said sleeve synchronously with said input shaft includes means on said sleeve for coupling said sleeve to said input shaft for synchronized rotary motion therewith, said coupling means allowing relative axial motion of said sleeve and said input shaft.

4. A seal arrangement for preventing leakage through a shaft opening in a housing for a planetary drive assembly where a first shaft passing through said opening undergoes axial and rotary motion, said seal arrangement comprising:

a sleeve radially surrounding at least a portion of said first shaft;

a second shaft for driving a sun gear of said planetary drive assembly slidably engaging said first shaft for rotational motion therewith and having a series of splines for engaging a series of splines on said sleeve to synchronize rotation between said sleeve and said second shaft;

means for receiving rotary motion from said first shaft and synchronizing rotation between said first shaft and said sleeve;

means for preventing axial movement of said sleeve relative to said opening;

first means for blocking leakage between said first shaft and said sleeve, said first means having a greater ability to block leakage where there is relative axial movement between surfaces than relative rotation; and second means for blocking leakage between said sleeve and said housing, said second means having a greater ability to block leakage where there is relative rotary movement between surfaces than relative axial movement.

5. The seal arrangement of claim 4 wherein said sleeve is positioned at least partially within said opening and the outer surface of said first sleeve is circular in cross section and concentric with the axis of rotation of said shaft.

6. The sealing arrangement of claim 5 wherein said first blocking means comprises a first seal fixed with respect to said sleeve, said second blocking means comprises a second seal fixed with respect to said housing and said first seal presses against said first shaft with a higher force than said second seal presses against said sleeve.

7. The sealing arrangement of claim 4 wherein said sleeve is nonrotatably and slidably coupled to said first shaft and said synchronizing means includes a series of splines on the inside of said sleeve engaging a series of splines on said first shaft.

8. In the combination of a housing for a planetary assembly having a shaft opening, a drive shaft extending into said opening for axial and rotary movement relative to the housing and having an axial passage open to the interior of the housing, and a driven shaft in the housing extending into the axial passage of the first shaft and splined to the first shaft for rotation therewith and axial sliding movement relative thereto, a sealing arrangement between the first shaft and the housing comprising:

a sleeve positioned over said shafts and between said drive shaft and housing, said sleeve being splined to one of said shafts for rotation with said shafts and axial movement relative to said drive shaft;

means for preventing axial movement of the sleeve relative to the housing;

a first seal positioned between and sealingly engaging said sleeve and housing; and a second seal positioned between and sealingly engaging said sleeve and drive shaft.

* * * * *

UNITED STATES PATENT AND TRADEMARK OFFICE
CERTIFICATE OF CORRECTION

PATENT NO. : 4,693,699

DATED : 15 September 1987

INVENTOR(S) : Stanley Martin Gregerson

It is certified that error appears in the above-identified patent and that said Letters Patent is hereby corrected as shown below:

Col. 7, line 13, delete "first" and insert -- second --.

Signed and Sealed this

Fourteenth Day of June, 1988

Attest:

DONALD J. QUIGG

*Attesting Officer*        *Commissioner of Patents and Trademarks*